(12) United States Patent
Nero

(10) Patent No.: US 10,458,084 B2
(45) Date of Patent: Oct. 29, 2019

(54) WATER BARRIER FOOT ELEMENT, A WATER BARRIER SHIELD SUPPORT ELEMENT, A WATER BARRIER SHIELD SYSTEM AND A METHOD FOR MANUFACTURING A WATER BARRIER FOOT ELEMENT

(71) Applicant: Inero AB, Mansarp (SE)

(72) Inventor: Ingvar Nero, Mansarp (SE)

(73) Assignee: Inero AB, Mansarp (SE)

( * ) Notice: Subject to any disclaimer, the term of this patent is extended or adjusted under 35 U.S.C. 154(b) by 8 days.

(21) Appl. No.: 15/765,036

(22) PCT Filed: Sep. 13, 2016

(86) PCT No.: PCT/EP2016/071575
§ 371 (c)(1),
(2) Date: Mar. 30, 2018

(87) PCT Pub. No.: WO2017/055079
PCT Pub. Date: Apr. 6, 2017

(65) Prior Publication Data
US 2018/0274190 A1      Sep. 27, 2018

(30) Foreign Application Priority Data
Oct. 2, 2015   (SE) .................................. 1551261

(51) Int. Cl.
*E02B 3/10* (2006.01)
*F16M 11/22* (2006.01)

(52) U.S. Cl.
CPC ............ *E02B 3/106* (2013.01); *F16M 11/22* (2013.01); *F16M 2200/08* (2013.01)

(58) Field of Classification Search
CPC .............. E02B 3/10; E02B 3/106; E02B 7/02
See application file for complete search history.

(56) References Cited

U.S. PATENT DOCUMENTS 6,079,904 A *  6/2000  Trisl ..................... E02B 3/106
                                                          405/107
6,840,711 B1 *  1/2005  Martinez ............... E02B 3/106
                                                          405/107
(Continued)

FOREIGN PATENT DOCUMENTS

DE      202011101262 A1    8/2011

*Primary Examiner* — Benjamin F Fiorello
(74) *Attorney, Agent, or Firm* — Olive Law Group, PLLC

(57) ABSTRACT

The invention relates to a water barrier shield foot element for supporting a protective module of a water barrier shield configured to be positioned between a body of water and an area of land to be protected. The water barrier foot element is configured to be arranged against a ground surface and extends in a longitudinal direction, wherein the foot element comprises a base element, a front end, a rear end and a first and a second longitudinal side portion. The front end is configured to be arranged in a direction towards the protective module, characterized in that the base element at one of either the rear end or the front end of the foot element is wider than the other so that the base element has a trapezoidal shape. The invention further relates to a water barrier shield support arrangement, a water barrier shield system and a method for manufacturing a water barrier shield foot element.

8 Claims, 8 Drawing Sheets

(56) References Cited

U.S. PATENT DOCUMENTS

| | | | | |
|---|---|---|---|---|
| 8,640,901 | B2* | 2/2014 | Davis | E02B 3/106 |
| | | | | 220/1.6 |
| 9,157,205 | B1* | 10/2015 | Novotny | E02B 3/106 |
| 9,409,707 | B2* | 8/2016 | Perkins | B65D 90/08 |
| 10,087,593 | B2* | 10/2018 | Krogenes | E02B 3/106 |
| 2003/0156903 | A1* | 8/2003 | Wiseman | E02B 3/106 |
| | | | | 405/115 |
| 2013/0071188 | A1* | 3/2013 | Taylor | E02B 7/20 |
| | | | | 405/114 |
| 2013/0121768 | A1* | 5/2013 | Powell | E02D 29/02 |
| | | | | 405/114 |

* cited by examiner

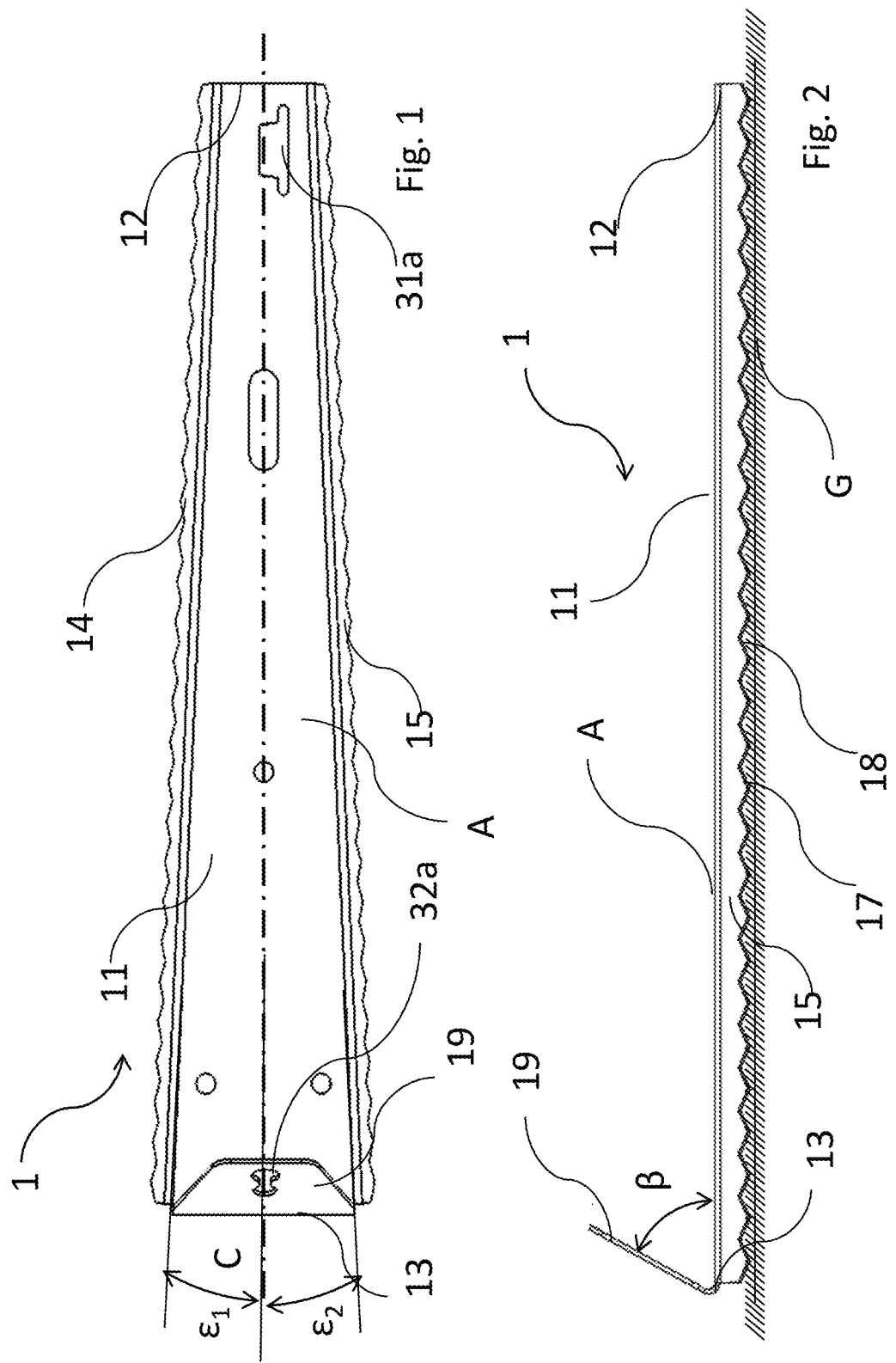

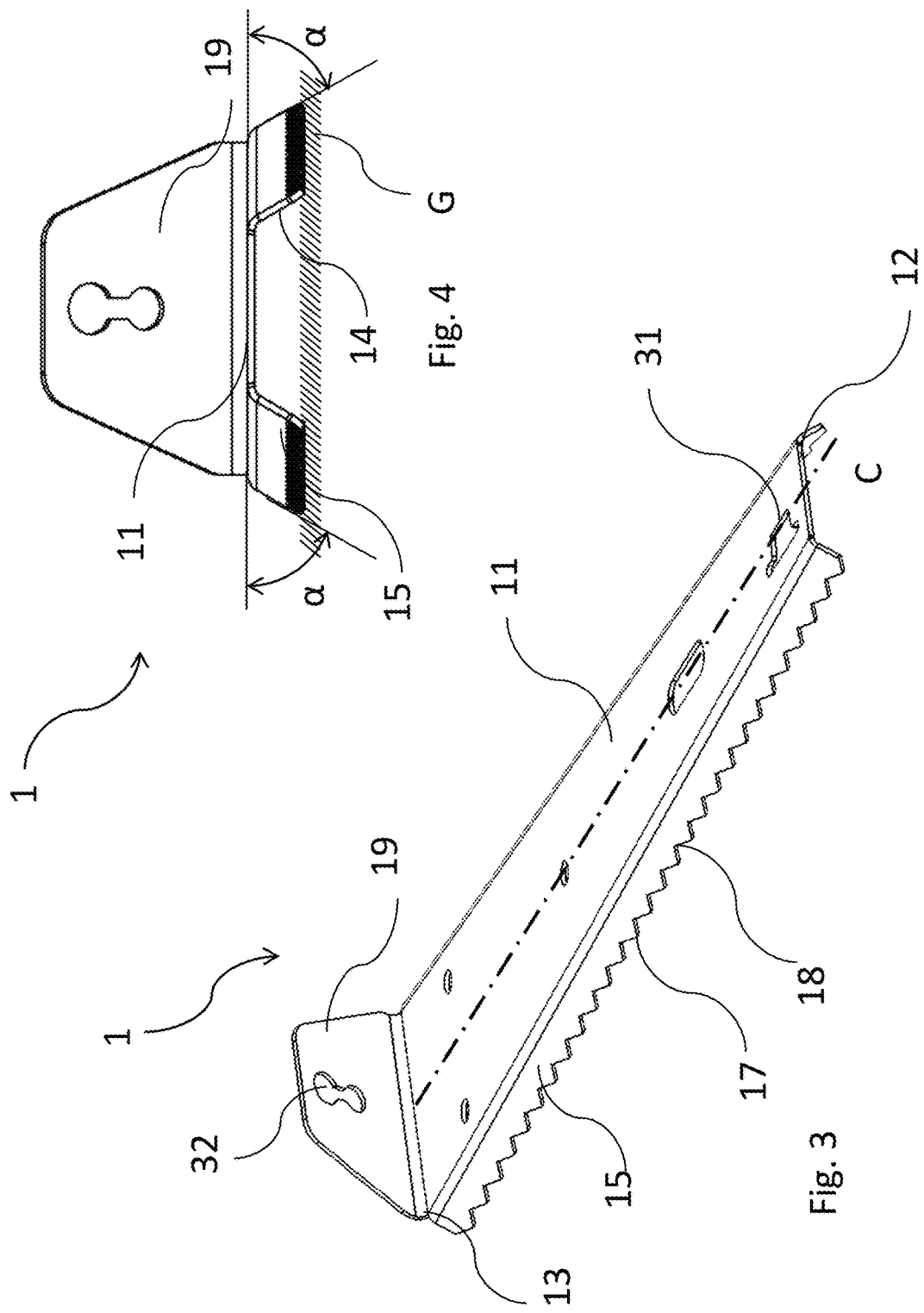

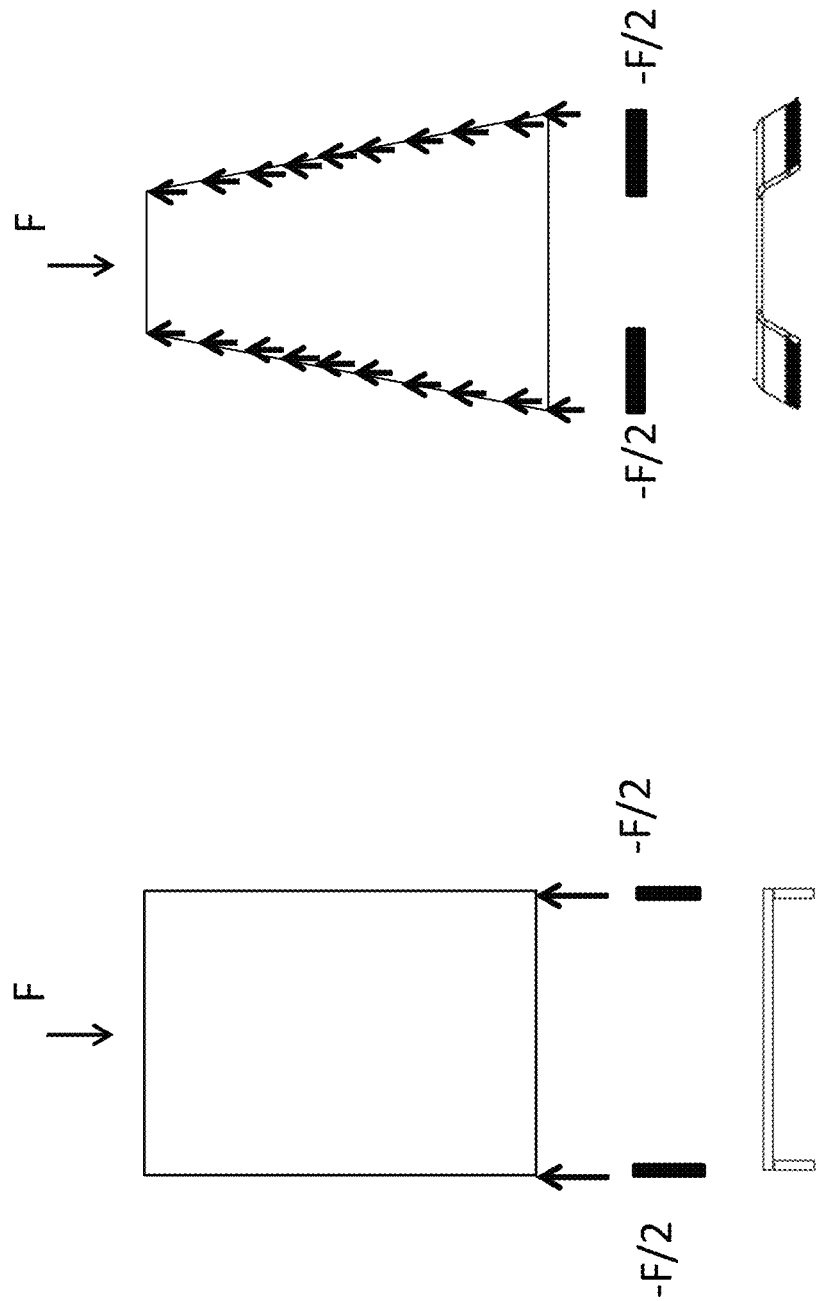

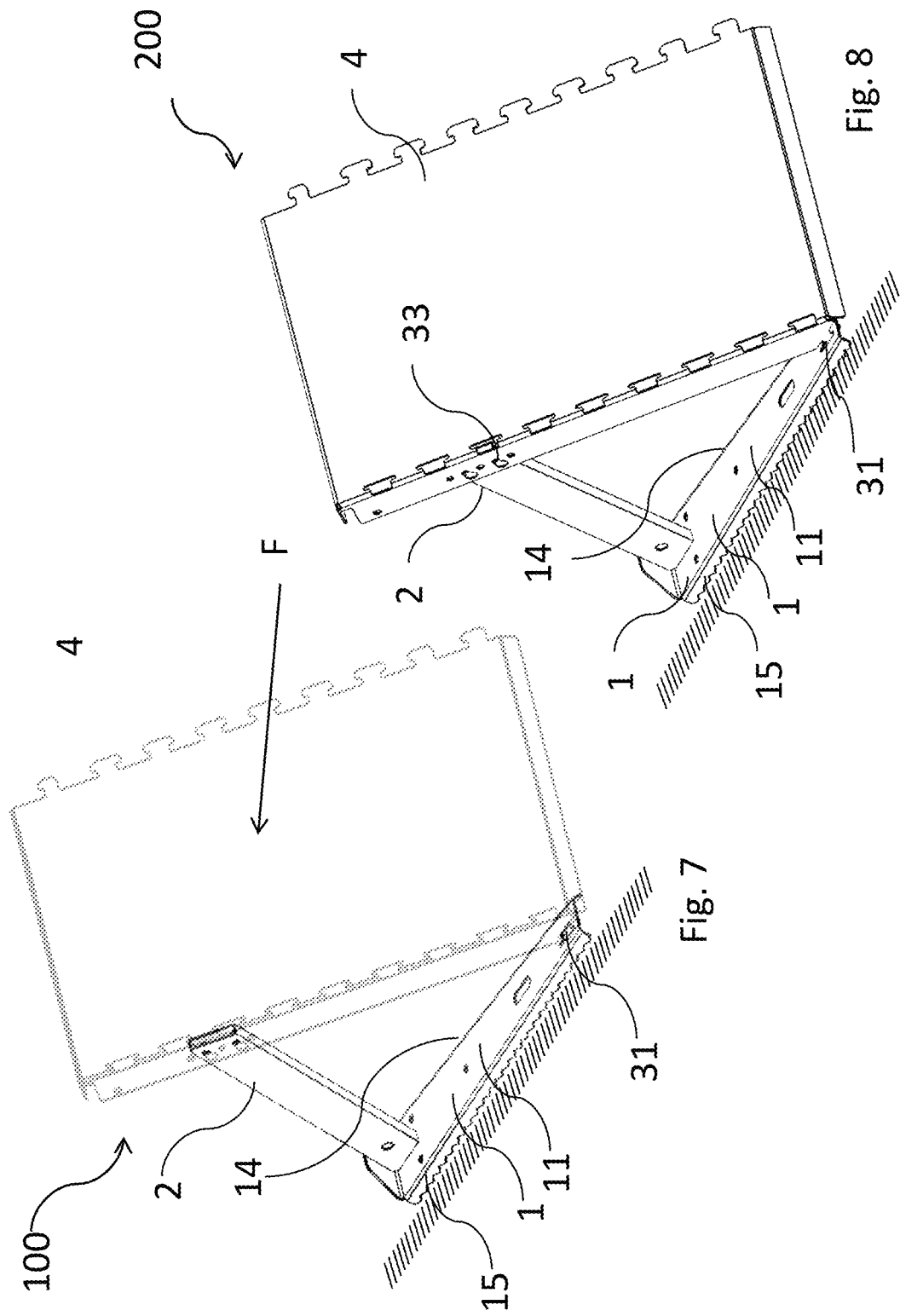

WATER BARRIER FOOT ELEMENT, A WATER BARRIER SHIELD SUPPORT ELEMENT, A WATER BARRIER SHIELD SYSTEM AND A METHOD FOR MANUFACTURING A WATER BARRIER FOOT ELEMENT

CROSS REFERENCE TO RELATED APPLICATIONS

This application is a 35 USC 371 application of International PCT Patent Application No. PCT/EP2016/071575, filed on Sep. 13, 2016, which claims priority to Sweden Patent Application No. 1551261-9, filed on Oct. 2, 2015; the contents of which are hereby incorporated by reference herein in their entireties.

TECHNICAL FIELD

The present disclosure relates to a water barrier shield, and especially an arrangement relating to a water barrier shield support for supporting the water barrier shield.

BACKGROUND

In the event of flooding, an efficient water barrier shield may be used to resist the water to enter certain areas. There are several water barriers in the market that may more or less efficiently provide a shield from a body of water. For instance, there is an upright fence type of barrier, usually made from a heavy material such as concrete in order to withstand the forces from the water. However, this type of is heavy and bulky, and need heavy transportation and lifting equipment upon installation. To solve this, there are various types of sheet metal barriers, having a plate arranged towards the water and some kind of support arrangement to stabilize the barrier. However, a common problem with these barriers is that since the barriers and the support arrangements have a light construction, the barrier may fall or slide, due to the forces from the water. There is thus a need for a better support arrangement for flood barriers.

SUMMARY

In view of the above, an objective of the invention is to solve or at least reduce the drawbacks discussed above. Generally, the above objective is achieved by the attached independent patent claims.

According to a first aspect, the present invention is realized by water barrier shield foot element for supporting a protective module of a water barrier shield configured to be positioned between a body of water and an area of land to be protected. The water barrier foot element is configured to be arranged against a ground surface and extends in a longitudinal direction The foot element comprises a base element, a front end, a rear end and a first and a second longitudinal side portions. The front end may be configured to be arranged in a direction towards the protective module. The base element is at one of either the rear end or the front end of the foot element wider than the other so that the base element has a trapezoidal shape.

With a foot element according to the invention, with one end of the foot element wider than the other, there may be a better chance of reducing sliding of the water barrier due to its trapezoid shape. The shape provides a plowing effect, since any force acting upon the barrier will spread along the side portions and thus equalizes the pressure acting upon the foot element over a larger area in two dimensions. This is an advantage since forceful water masses may, with conventional supports without the trapezoid shape, may drag the water barrier and thus shear the foot element against the ground.

In one embodiment, the base element may extend in a first plane and the first and second longitudinal side portions may protrude from the first plane. In one embodiment the first and second longitudinal side portions protrudes in a downwards direction from the first plane, when in use.

By having a foot element with side portions protruding from the first plane, the side portion may provide additional gripping against the ground and thereby may prevent shearing between the foot element and the ground. Compared to a foot element that has a continuous flat surface in contact with the ground, a foot element having protruding side portions may also result in a more stable foot element. The foot element may further provide efficient gripping effect against the ground by allowing the side portions to partially penetrate the ground surface. For instance, on a soft ground surface, such as a lawn, a conventional foot element having a flat portion towards the ground may slide in any direction. The projected side portions may however act as stoppers and penetrate the soil and thereby resist the forces acting foot element.

In one embodiment, the projecting side portions may project in an angle relative to the base element, so that they protrude symmetrically relative the first plane that the base element extends in.

In yet one embodiment, the angle relative the base element may be less than 90 degrees. Thereby, the foot elements may be stackable on each other during transportation and storage. This is an advantage since transportation of large items may be expensive. Therefore, a stackable item may reduce the transportation space, and thereby transportation costs, as well as a stackable item may be more flexible to handle. The angle may be adapted such that when one or more foot elements are stacked on top of each other, only the material thickness determines the height of the stacked pile. This may be possible with an angle not being larger than about 60-80 degrees, preferably about 60 degrees or less.

In yet one embodiment the first longitudinal side portion may be arranged at a first angle relative a centre line of the foot element, and the second longitudinal side portion may be arranged at a second angle in the opposite direction relative the centre line, such that the rear end of the foot element may be wider than the front end of the foot element.

Thereby, each longitudinal side will hinder shearing against the ground. Moreover, since the longitudinal side portions are arranged in an angle relative the centre line, any forces acting along the centre line will result in a force component perpendicular to the centre line. By having the two longitudinal side portions arranged in opposite directions relative the centre line, the forces being perpendicular to the centre line will limit the total force component in the direction, thus limiting any sideway shearing. The rear end may be wider because a larger amount of load may be distributed to the rear end than to the front end, due to any momentum caused by the water forces. Further, if there is a great amount of water, the water may wash over the water barrier shield. In that case there may be a risk of erosion due to the water. A wide rear end of the foot element may help preventing the erosion in a more efficient manner than a narrow rear end.

The trapezoidal shape of the base element with side portions with equal length may further equalize any forces acting upon the foot element. Forces acting upon a symmetric shape, such as a trapezoid when forces acting from the rear end or front end, i.e. when hitting the foot element from a direction parallel to the centre line, may more equally and efficiently withstand the water forces comparing to an unsymmetrical shape. An unsymmetrical shape may cause the foot element to rotate due to uneven load take-up, and thus cause the water barrier to be pushed out of position.

In one embodiment, the foot element comprises gripping means. The gripping means are arranged to, when in use, provide friction against the ground surface in order to withstand shearing forces resulting from the mass of the body of water.

By having a foot element equipped with gripping means, for instance on the projected side portions, additional grip may be provided towards the ground surface. For instance, on a harder surface, such as asphalt or concrete, a flat surface may not provide adequate grip. In such cases some sort of gripping means may be necessary. Gripping means may be in the form of hooks, anti-slippage devices, grooves, or some other type of pattern that may have an anti-slipping effect. The gripping means may also be made from different types of material depending on the ground surface structure. For instance, on a soft surface such as grass or dirt, a gripping means that may penetrate the soil may be preferable. Further, an asphalt ground surface, which naturally may have a more uneven surface, may require a gripping means which provide friction, such as teeth or a rough coating. The gripping means may hence be adapted to which ground surface the foot element is about to be placed.

In another embodiment, the gripping means may be in the form of a plurality of projections and valleys arranged along each of the first and second longitudinal side portions.

An advantage with this type of gripping means is that the projections and valleys, which may be in the shape of for example small hooks, pegs or teeth, may be adapted to suit many different ground surfaces. The length and thickness of the projection and valleys may be changeable. Further, for instance a teethed foot element may be efficient on a soil ground, but equally efficient on asphalt ground. This is an advantage since the teethed foot element may be used on many types of surfaces.

In yet another embodiment, the foot element and the gripping means may be formed from a single piece of material.
This may be an advantage since it may provide a more durable product, and reduce manufacturing times and manufacturing costs since the number of manufacturing steps may be few. For instance, a foot element according to the invention may be made from a sheet material, and either side portion may be bent to its final shape. Further, due to the shape of the foot element, a plurality of foot elements of the type may be manufactured from a single sheet of material, wherein each foot element may be cut and bent, in such a way that the amount of waste material may be kept to a low. Alternatively, the foot element may be die cast, hot formed or manufactured in any other suitable way. The material used may be any suitable material with a suitable material thickness. A hard material may be suitable, such as metal, hard plastic, composite, ceramic or the like, in order for the foot element to withstand any shear forces against the ground. The material used may preferably be a metal, most preferably a sheet metal. The material thickness may be any thickness depending on the size of the foot element in the specific installation. However, a common thickness may be 2-8 millimeters, more typically 3-6 millimeters, most preferably about 4 millimeters.

According to a second aspect, there is provided a water barrier shield support arrangement for supporting a protective module of a water barrier shield configured to be positioned between a body of water and an area of land to be protected. The protective module has a main plane, adapted to be arranged towards the body of water. The water barrier shield support arrangement has a foot element and a first support element having an upper end and a lower end. The first support element is configured to be arranged at an angle relative the foot element in order to provide support to the water barrier. The upper end may be connected to the protective module, and the lower end connected to the rear end of the foot element.

The water barrier shield foot element may be configured to be part of a water barrier shield support arrangement configured to support a protective module of a water barrier. The protective module may be configured to be arranged towards the water, and having a main plane which may be arranged at an angle relative to the ground. The support arrangement comprises a foot element and a first support element. While the foot element may be configured to be arranged on the ground, with any gripping means directed towards the ground, the support element may be configured to support the protective module at the upper end, and rested towards the foot element at the lower end. The support element may thus be arranged at an angle relative to the ground in order to provide stability to the arrangement. By having the support element arranged at an angle, any forces acting upon the protective module may be transferred via the first support element down to the foot element. Thereby, the gripping means of the foot element may be provided with a load that provides the foot element with a force such that it may be pressed towards the ground, which contributes to the friction force against the ground surface. The rear end may be wider because a larger amount of load may be distributed to the rear end via the first support element.

In one embodiment the protective module and the foot element are releasably connectable by means of a first connecting element integrated in the foot element and a second connecting element integrated in the protective module.

In one embodiment the first and second connecting element are complementary to one another.

In yet one embodiment the first connecting element comprise a protruding portion and the second connecting element comprise a slot. In that way a male/female type connection may be achieved and the use of loose fastening elements may be prevented.

In one embodiment the water barrier shield support further comprises a first, second and third connecting means arranged to connect the foot element to the protective module, to the first element, and to connect the first support element to the protective module, respectively. The first connecting means constitutes a first connecting element incorporated in the front end of the foot element and a second connecting element may be incorporated in the protective module. The second connecting means constitutes a first connecting element incorporated in the rear connecting portion of the foot element and a second connecting element may be incorporated in the lower end of the first support element. The third connecting means constitutes a first connecting element incorporated in the upper end of the first support element, and a second connecting element incorporated in the protective module. Each connecting means may be configured to provide a secure connection to one another without the use of loose fastening elements.

According to another aspect, there is provided a water barrier shield system comprising a protective module and a water barrier shield support. The first support element and the foot element may be configured to support the protective module. Each of the protective module, the first support element and the foot element may be independently connectable and detachable.

With a system comprising a water barrier support system and a protective module, it may be possible to build a module based barrier at any size and length. The system, that is the foot element, the first support element and the protective module, is configured to be attachable to each other, and configured to be detachable, stackable and transportable such that a plurality of parts may be transported using relatively little space on a trailer or in a car.

According to another aspect, there is provided a water barrier shield formed from the system. The water barrier shield comprises at least one of each of the protective module, the first support element and the foot element, in order to form a module-based wall for protection against a body of water.

According to another aspect, there is provided a method for manufacturing a water barrier foot element, comprising the steps of providing a sheet material, cutting a first foot element from the sheet of metal, cutting a second foot element from the sheet of metal. Further, the second foot element may be cut adjacent to the first foot element so that a single cutting action simultaneously forms a longitudinal side portion of the first foot element and a longitudinal side portion of the second foot element. Further the step of bending each longitudinal side portion along the first and second longitudinal sides of each cut foot element so that the longitudinal side portions protrude from the original plane of the sheet material.

This method provides an advantage since a plurality of foot elements may be manufactured from a single piece of sheet material. Also, by configuring the foot element such that a first and a second foot element share one cutting side, waste material is reduced and also manufacturing costs and times is reduced. The pattern in which each foot element is to be cut may be determined depending on the manufacturing tools used. For instance, the foot elements to be cut may be arranged such that a first longitudinal side of a first foot element constitutes a first longitudinal side of a second foot element. In another embodiment, the foot elements to be cut may be arranged such that a first longitudinal side of a first foot element constitutes a second longitudinal side of a second foot element 1b. In that way, the cutting may be done for two longitudinal sides at a time.

In one embodiment the rear end of the first foot element is placed next to a front end of a second foot element, so that the common width of the two foot element is even. Hereby, the wider rear end complements the narrower front end so as to form a substantially straight form. Hereby, less material is needed compared to if the rear ends were placed adjacent to each other.

The pattern in which the foot elements are to be cut may be done such that a first and a second foot element may be placed in a zig zag pattern, such that a rear end of a first foot element may be placed next to a front end of a second foot element, and so on, in order to create adjacently placed foot element patterns and thereby keep any waste material to a low.

In one embodiment, the method further comprises the step of bending a rear end portion of each cut foot element such that a rear connecting portion may be formed.

In one embodiment of the method, the first and second longitudinal side of the first and second foot element comprise a plurality of projections and valleys and wherein each projection of the first foot element's first longitudinal side constitutes a valley of the second foot element's second longitudinal side.

The sheet material used may be a sheet of metal, sheet of plastics or any other sheet material with similar strength and characteristics. In the context of this application "cutting", it is meant the operation of any one or several of pressing, stamping, punching, die-cutting, water jet cutting, laser cutting, ripping or any other operation that means separating one part from the other. Most preferably the method of laser cutting or water jet cutting may be used since these methods are clean in the sense that they do not generate dust, ships waste or spillage. These cutting methods mentioned are also energy efficient.

As subject to the capacity of manufacturing tools, a plurality of the foot elements may be cut at the same time. Alternatively, each foot element may be cut in sequence, if more suitable.

In one embodiment, the first bending angle may be an angle smaller than 90 degrees, preferably between 50 and 80 degrees, such as to form a foot element that may be stackable on top of one another. And the second bending angle may be an angle smaller than 90 degrees, preferably between 50-70 degrees, most preferably 60 degrees. The bending angles may thus be configured such that any when stacking of two or more foot elements, the height of the pile may be determined only by the material thickness. The foot element may thus be stacked tight together in order to reduce transportation space.

BRIEF DESCRIPTION OF THE DRAWINGS

The invention will in the following be described in more detail with reference to the enclosed drawings, wherein:

FIG. 1 illustrates a top view of a water barrier foot element according to the invention.

FIG. 2 illustrates a side view of a water barrier foot element according to the invention.

FIG. 3 illustrates a perspective view of a water barrier foot element according to the invention.

FIG. 4 illustrates a front view of a water barrier foot element according to the invention.

FIG. 5 is a schematic illustration of load acting on a conventional foot element.

FIG. 6 is a schematic illustration of load acting on a water barrier foot element according to the invention.

FIG. 7 illustrates a perspective view of a water barrier support arrangement according to the invention.

FIG. 8 illustrates a perspective view of a water barrier support arrangement according to the invention.

DETAILED DESCRIPTION OF EMBODIMENTS

Figure 9:
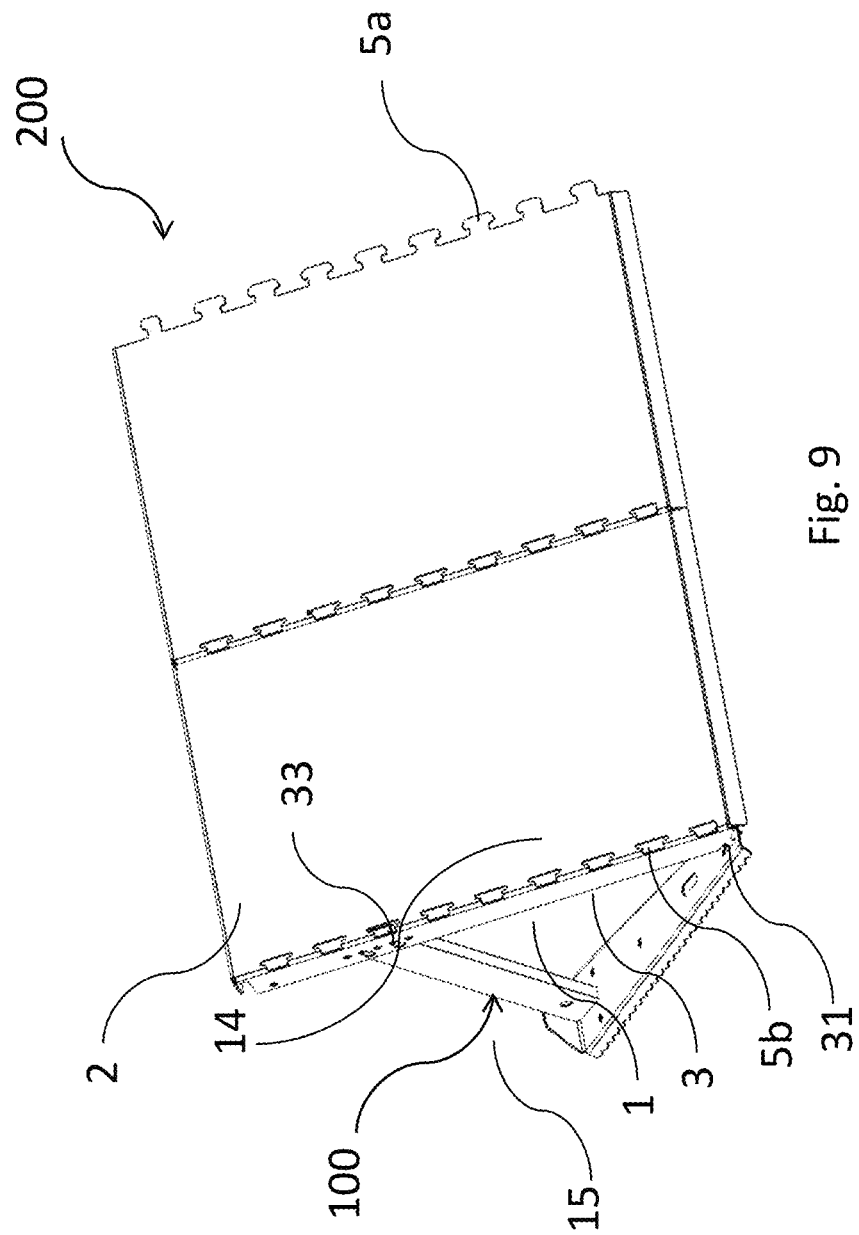
FIG. 9 illustrates a perspective view of a plurality of water barrier shields using the support arrangement according to the invention.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

In FIG. 1, it is illustrated a top view of a water barrier shield support foot element 1 according to the invention. The foot element 1 has a base element 11 which extends in a first plane A of the foot element 1. A centre line C runs along the centre of the foot element 1 in a longitudinal direction. The foot element is configured to be arranged towards a ground surface G on which a water barrier shield is to be arranged. The foot element 1 is arranged towards the ground such that the first plane A is placed substantially parallel to the ground surface G, or on the ground surface G. The foot element has a front end 12 and a rear end 13 which are situated on a respective opposite end of the foot element 1 in the longitudinal direction. The rear end 13 of the foot element in FIG. 1 is wider than the front end 12, with the width symmetrically distributed on each side of the centre line, resulting in a trapezoidal shape. Depending on the current installation, the front end 12 may be the wider end of the two. The foot element has a first 14 and a second 15 longitudinal side portion, running between a respective corner on the rear end 13 and the front end 12. Each longitudinal side is provided with gripping means 16. In FIG. 1 the gripping means are a plurality of projections 17 and valleys 18. The projections and valleys may be in the form of hooks, teeth or other irregular shape in order to provide grip against a ground surface G. The longitudinal side portions 14, 15 protrude from the base element 11, which is shown in detail in FIG. 2. The side portions 14, 15 may protrude in a direction at an angle α (shown in FIG. 4) from the base element 11 such that the gripping means 16 may grip a ground surface G.

In FIG. 2, there is shown a side view of a foot element. Here it is illustrated that the base element constitutes a plane A, and longitudinal side portions (14, 15) is protruded from the plane A. in connection to the rear end, a rear connecting portion 19 is arranged. The rear connecting portion may be used for connection with other support elements that may be part of the water barrier shield. Further the rear connection element 19 may be, as shown, protruded from the plane A at an angle β. The angle β may be an angle less than 90 degrees, preferably between 50-70 degrees, most preferably 60 degrees.

FIG. 3 shows a perspective view of a foot element 1. In this view it is clear that the first and second side portions 14, 15 protrudes at an angle α from the first plane A. The angle may be determined from calculations on the resistance or friction achieved against the ground surface G.

FIG. 4 shows a front view of a foot element 1. From the illustration, it is further illustrated that the first 14 and second 15 side portions protrudes from the base element 11 at an angle α. The angle α may be an angle smaller than 90 degrees, preferably between 50 and 80 degrees, such as to form a foot element that may be stackable on top of one another, most preferably 60 degrees.

In FIG. 5, the difference in load take up and shear against the ground surface G when using a square foot element is shown schematically. Normally, a water barrier shield is placed such that the force from the water affects a barrier shield, and any foot element that is in contact with the ground is affected by shear forces. In FIGS. 5 and 6, it is schematically shown the difference between a square foot element, and a foot element 1 according to the invention. The square foot element is affected by the water forces F from the front. If the square foot element comprises protruding side portions, the force F will be absorbed through the side portions. The side portions being arranged on a straight line may therefore each absorb F/2, distributed on a small area. A straight side portion may therefore behave like a knife against the ground surface G, and therefore shear due to large amount of energy on a small surface. If a foot element instead is configured like the foot element according to the invention, as shown in FIG. 6, the force pattern is more equal along the width of the foot element 1, and the shear against the ground surface G distributed on a larger area. This leads to a more efficient grip since the gripping portion effects a larger cross sectional area of the foot element 1. Equally, if the conventional foot element would not comprise any gripping means, the flat surface that may be in contact with the ground may only absorb the energy the friction forces against the ground may absorb. If the water forces are very large, the foot element would only slide on the ground. Thus, the gripping means 16 distributed along angled side portions 14, 15 may therefore distribute the load along the width, and therefore the gripping means may absorb more energy than if the gripping means would be distributed on either a line in the load direction, or if the foot element would be without any gripping means.

FIG. 7 illustrates a water barrier shield support arrangement 100 according to the invention. In FIG. 7, it is shown that the arrangement 100 comprises a foot element 1, which is configured to be in contact with the ground surface G. The support arrangement 100 further comprises a first support element 2. The foot element 1 has a front end 12, which is configured to be connected to a protective module 4 (shaded) of the water barrier shield. The rear end 13 of the foot element 1 is configured to be connected to the first support element 2. Thereby, water forces acting upon the protective module 4 may be transferred via the first support element 2 down to the rear end of the foot element 1. In FIG. 7, the rear end 13 of the foot element 1 is wider than the front end 12. Therefore, the rear end 13 may take the load from the first support element 2, which generally may be larger than the force acting upon the front end 12. Any shear forces acting on the first support element 2 may thus be transferred and distributed on the foot element 1. The connection between the foot element 1 and the protective module 4 is done via a connecting means comprising a first connecting element 31a and a second connecting element 31b. The connecting means is configured such that a connection may be established between the protective module 4 and the foot element 1 without any loose fastening means. The connection is thereby done via an arrangement 100 directly contained in the two parts to be connected, the first connecting element 31a of the foot element 1 and the second connecting element 31b of the protective module 4. The connecting means 31 may be a type of male/female connection wherein the male connection is placed on either one of the foot element 1 or the protective module 4, but preferably on the protective module 4. In FIG. 7, the foot element 1 comprises the female connecting part of the connecting means. The first support element in FIG. 7 is arranged at an angle relative to the foot element 1, and to the protective module 4 in order to provide stability to the arrangement 100. The angle of the first support element 2 relative to the foot element 1 may be the same angle as the angle of the rear connecting portion 19. The force acting upon the protective module may be transferred via the first support element 2 to the foot element 1. It is however possible that the first support element 2 may be arranged at any angle, or perpendicular to the foot element 1, if the current installation admits such. It is also possible that the foot element 1 alone provides necessary support to the arrangement 100.

FIG. 8 shows a water barrier shield system 200 comprising the water barrier support arrangement 100 and a protective module 4. As described previously, the protective module 4 is connected to the support arrangement 100 via connecting means 33 which does not use any loose fastening elements. This is due to the risk of dropping and losing the fastening elements in the event of a flood.

Figure 10:
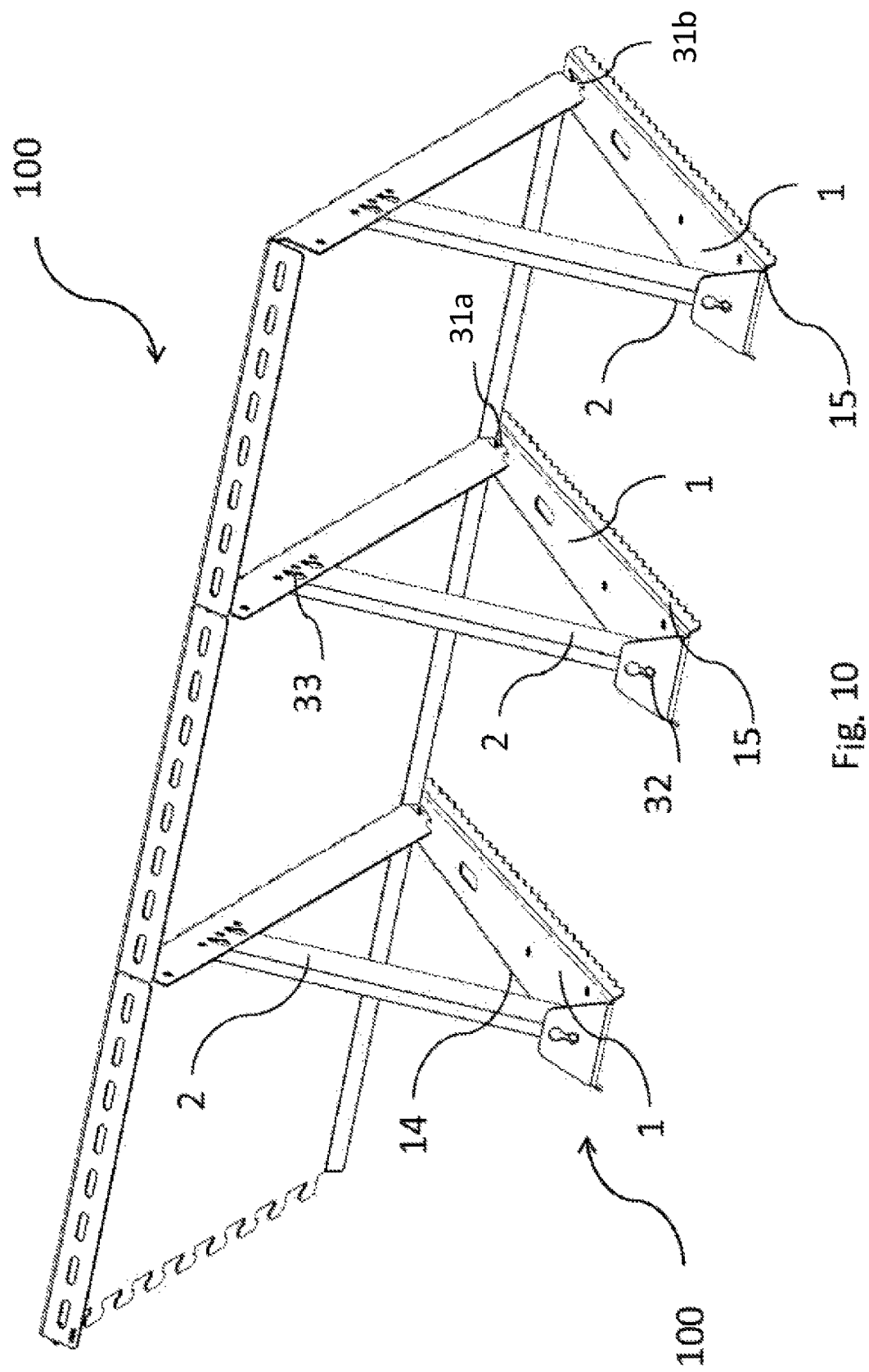
FIG. 10 illustrates a perspective view of a plurality of water barrier shields using the support arrangement according to the invention.

In FIGS. 9 and 10, it is shown a barrier built using the system 200. The plurality of protective modules 4 may be connecting via connecting means 5a and 5b. The connecting means 5a, 5b may be of a type where loose fastening elements are not used.

FIG. 10 shows a rear perspective view of a barrier built using the system 200. Further in FIG. 10, it is shown more clearly that the first support element 2 and the foot element 1 are connectable to each other via connecting means 32. The connecting means 32 may as well as connecting means 31 and 33 be a type of male/female connection wherein the male connection is placed on either one of the foot element 1 or the first support element 1. In FIG. 10, the foot element 1 comprises the female connecting part of the connecting means.

Figure 11:
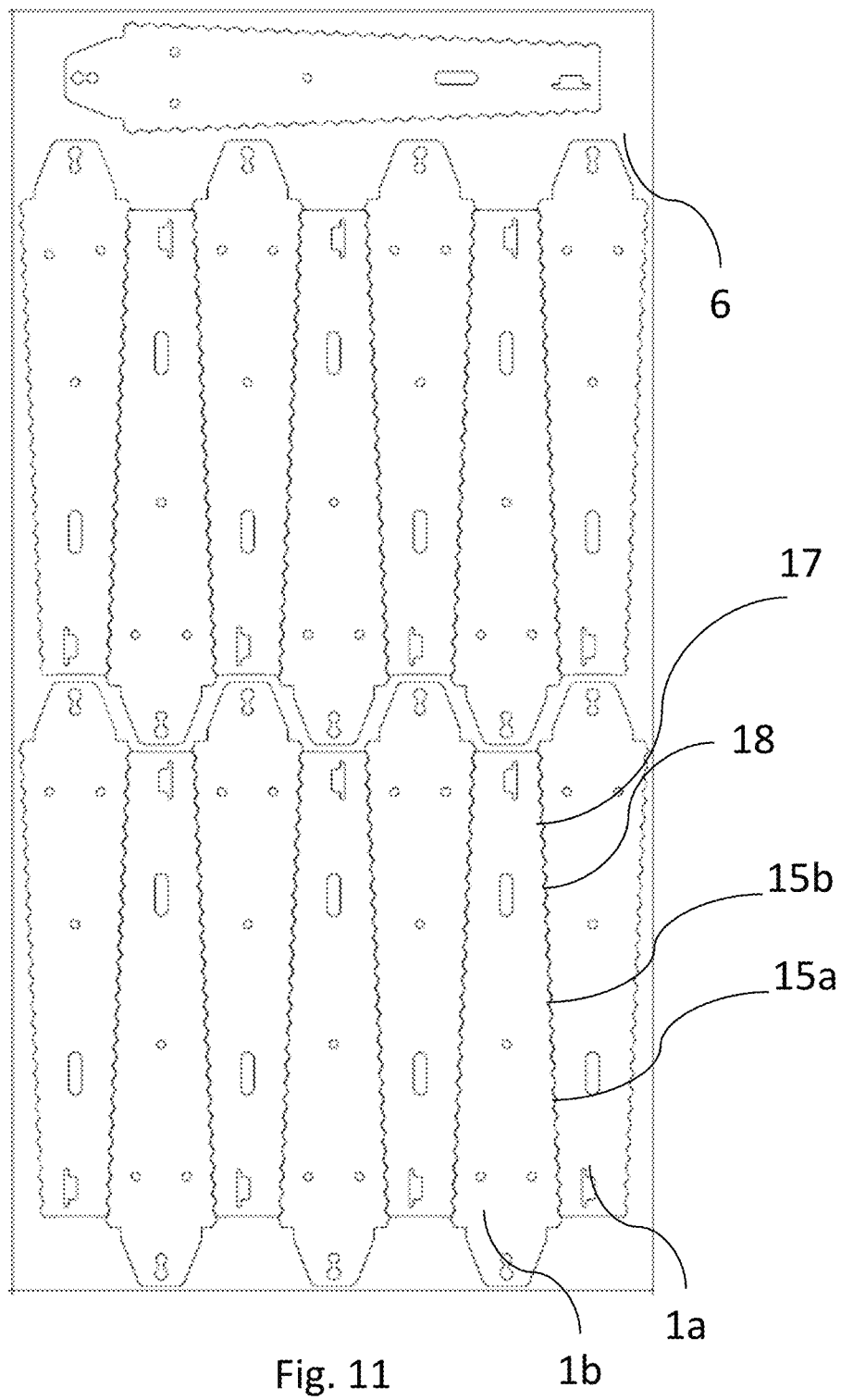
FIG. 11 illustrates a set of foot elements as cut from a sheet material according to the method of invention.

FIG. 11 shows a pattern after which the foot element 1 is cut using the method according to the invention. As seen, the pattern illustrates the foot element 1 as cut from a single piece of sheet material 6. The foot elements are cut from a pattern in which a first foot element 1a and a second foot element 1b shares the border, and the edge of the first longitudinal side portion 14a of the first foot element 1 constitutes the first longitudinal side portion 14b of the second foot element 1b. In that way, the manufacturing may be done quickly and also reduce any amount of waste material. Further, the gripping means are formed together, wherein each projection of the first foot element's 1a longitudinal side 14a, 5a constitutes a valley of the second foot element's 1b longitudinal side 14b, 15b. The pattern in which each foot element is to be cut may be determined depending on the manufacturing tools used, or any other reason. For instance, the foot elements 1 to be cut may be arranged such that a longitudinal side 14a of a first foot element 1a constitutes a longitudinal side 14b of a second foot element 1b. In another embodiment, the foot elements 1 to be cut is arranged such that a longitudinal side 14a of a first foot element 1a constitute a longitudinal side 15b of a second foot element 1b.

Figure 12:
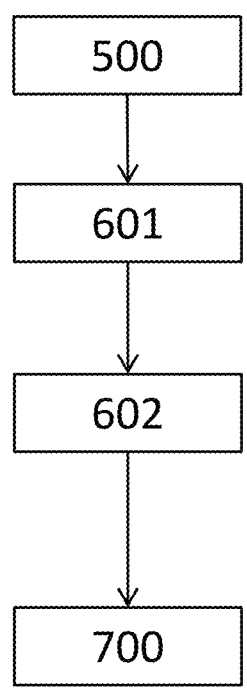
FIG. 12 is a flow chart illustrating manufacturing steps according to a method of the invention.

FIG. 12 shows a flow chart of a series of manufacturing steps according to the invention. Reading FIG. 11 and FIG. 12 together it is shown that a sheet material 6 may be provided 500, the sheet material is then cut 601, 602 according to a pattern, in which it is determined that two adjacent foot elements 1 to be cut are arranged such that a longitudinal side 15a of a first foot element 1a constitute a longitudinal side 15b of a second foot element 1b. The step of cutting 601, 602 may be done in sequence for each longitudinal side as described, or several sides at the time. The step of cutting 601,602 may therefore be done several times before all foot elements 1 has been cut 601, 602 from the sheet material 6. After the step of cutting 601, 602, and the foot element 1 is free, the step of bending 700 may be initialized. In the bending 700 procedure, the first and second longitudinal side portions may be formed at a respective bending angle. The bending 700 also includes bending of the rear connecting portion 19. It is possible that the cutting 601,602 may be done of several sheet materials 6 at a time, when for instance stacked on top of each other. The manufacturing procedure may be done several times sequentially.

While the present invention has been described with reference to a number of preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A water barrier shield foot element for supporting a protective module of a water barrier shield configured to be positioned between a body of water and an area of land to be protected, wherein the water barrier foot element is configured to be arranged against a ground surface and extends in a longitudinal direction, wherein the foot element comprises a base element, a front end, a rear end and a first and a second longitudinal side portion, wherein the front end is configured to be arranged in a direction towards the protective module, characterized in that the base element at one of either the rear end or the front end of the foot element is wider than the other so that the base element has a trapezoidal shape, wherein the base element extends in a first plane and the first and second longitudinal side portions protrude downwardly towards the ground surface from said first plane and wherein the first and second longitudinal side portions comprise gripping structure, wherein the gripping structure are arranged to, when in use, provide friction against the ground surface in order to withstand shearing forces from the body of water.

2. Water barrier shield foot element according to claim 1, wherein the first longitudinal side portion is arranged at a first angle relative a center line of the foot element, and the second longitudinal side portion is arranged at a second angle in the opposite direction relative said center line, such that the rear end of the foot element is wider than the front end of the foot element.

3. Water barrier shield foot element according to one of claims 1 or 2 wherein the gripping structure are in the form of a plurality of projections and valleys arranged along each of the first and second longitudinal side portion.

4. Water barrier shield foot element according to claim 1, wherein the base element and the gripping structure are formed from a single piece of material.

5. A water barrier shield support arrangement for supporting a protective module of a water barrier shield configured to be positioned between a body of water and an area of land to be protected, said protective module having a main plane, adapted to be arranged towards the body of water, said water barrier shield support arrangement comprising a foot element according to claim 1 and further comprising a first support element having an upper end and a lower end and configured to be arranged at an angle relative the foot element in order to provide support to the water barrier, wherein the upper end is connected to the protective module and the lower end connected to the rear end of the foot element.

6. A water barrier shield system comprising a protective module and a water barrier shield support arrangement as claimed in claim 5, wherein each of the protective module, the first support element and the foot element are independently connectable and detachable to each other.

7. A method for manufacturing a water barrier shield foot element according to claim 1, comprising the steps of:
   providing a sheet material,
   cutting a first foot element from said sheet of metal being a sheet of metal,
   cutting a second foot element from said sheet of metal, wherein the second foot element is cut adjacent to said first foot element so that a single cutting action simultaneously forms a longitudinal side portion of the first foot element and a longitudinal side portion of the second foot element,
   bending each longitudinal side portion along said first and second longitudinal sides of each cut foot element, so that said longitudinal side portions protrude from the original plane of the sheet material.

8. Method according to claim 7, wherein the first and second longitudinal side portions of the first and second foot element comprise a plurality of projections and valleys, wherein each projection of the first foot element's second longitudinal side portion constitutes a valley of the second foot element's second longitudinal side portion.

\* \* \* \* \*